April 5, 1966           B. CHAUVIN           3,244,336
METHOD AND APPARATUS FOR GRIPPING AND CUTTING FINE WIRE
Filed July 9, 1964           2 Sheets-Sheet 1
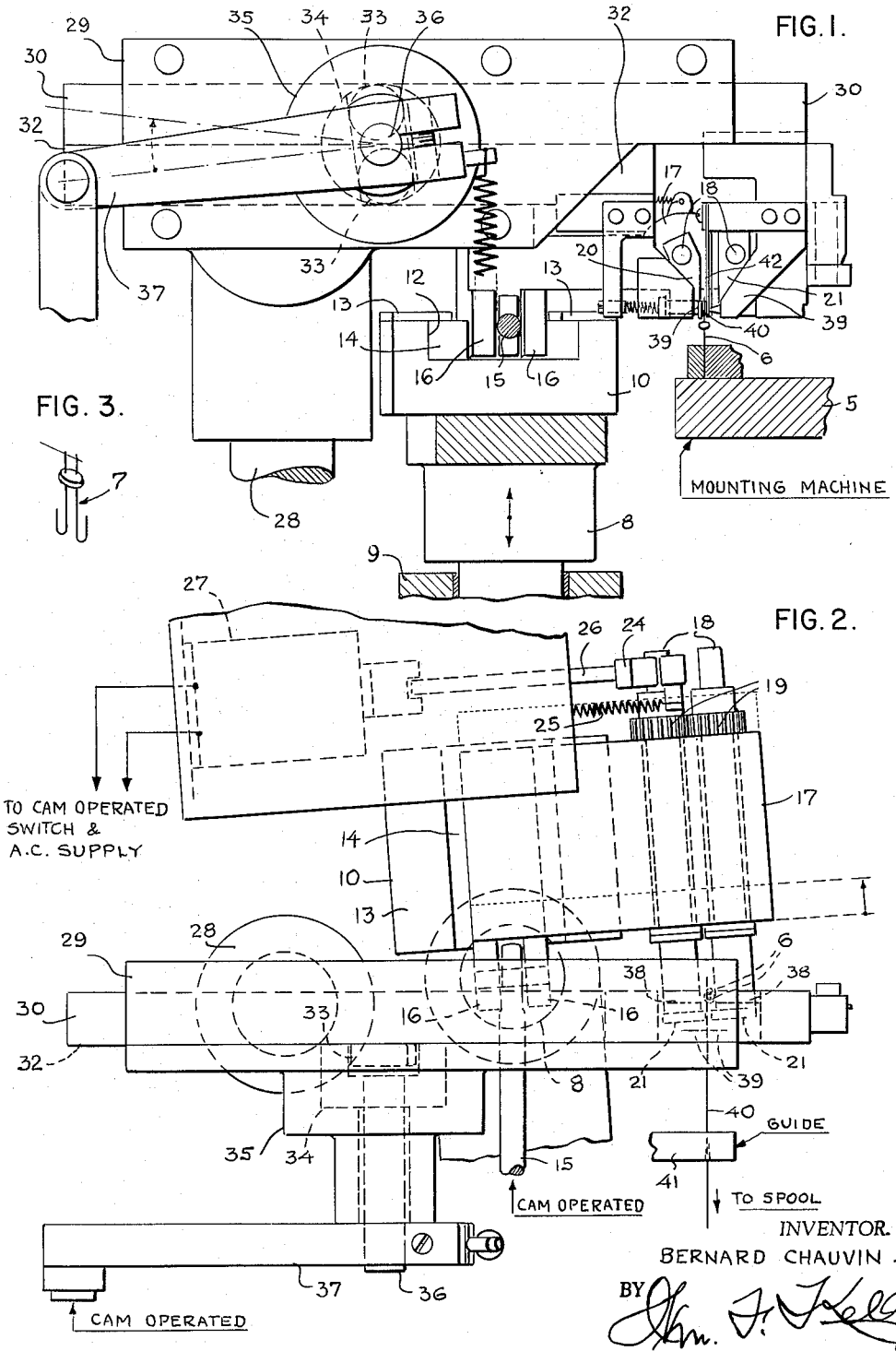
INVENTOR.
BERNARD CHAUVIN.
BY 
ATTORNEY.

April 5, 1966 B. CHAUVIN 3,244,336
METHOD AND APPARATUS FOR GRIPPING AND CUTTING FINE WIRE
Filed July 9, 1964 2 Sheets-Sheet 2
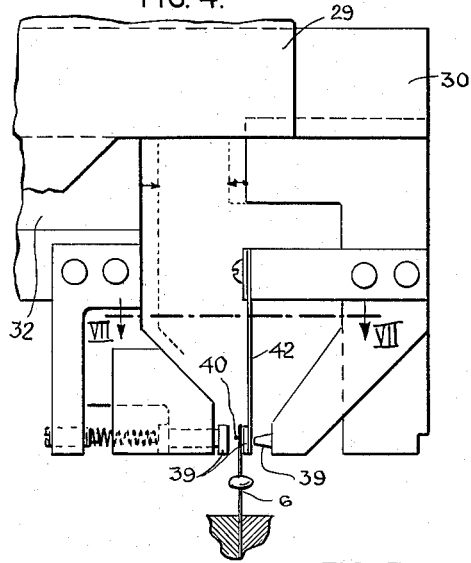
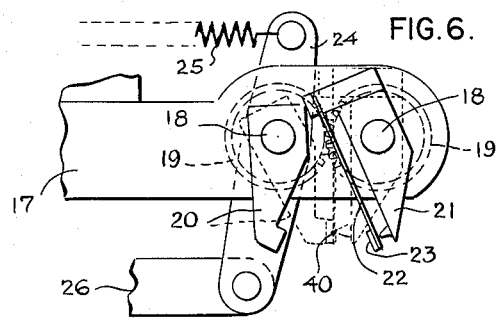
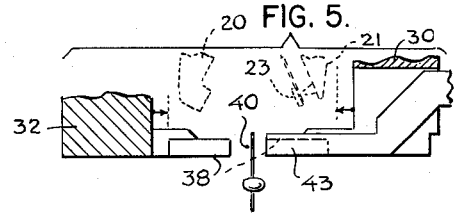
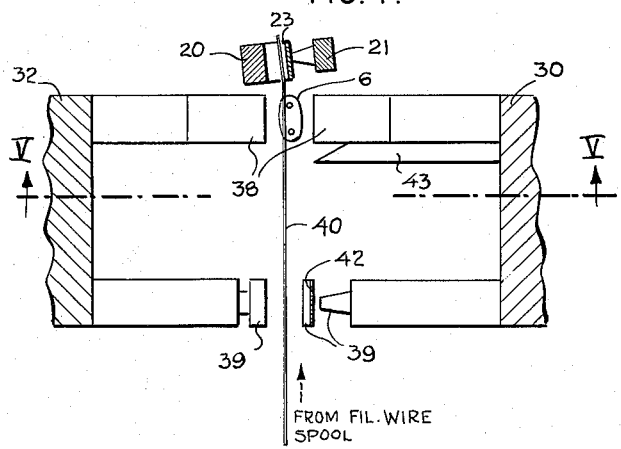
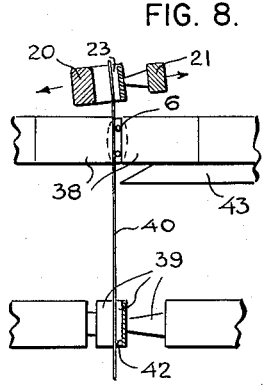
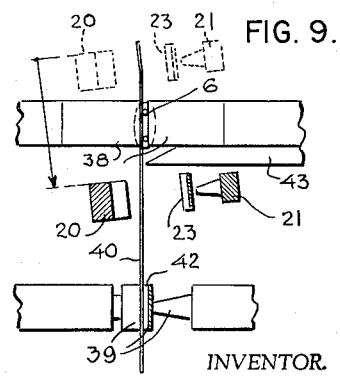
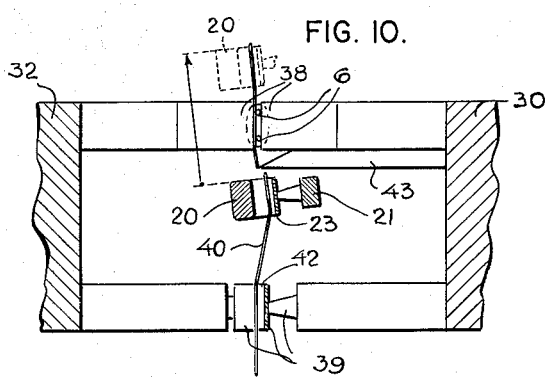
INVENTOR.
BERNARD CHAUVIN
BY
ATTORNEY United States Patent Office 3,244,336
Patented Apr. 5, 1966

3,244,336
METHOD AND APPARATUS FOR GRIPPING AND CUTTING FINE WIRE
Bernard Chauvin, Cedar Grove, N.J., assignor to Westinghouse Electric Corporation, East Pittsburgh, Pa., a corporation of Pennsylvania
Filed July 9, 1964, Ser. No. 381,490
12 Claims. (Cl. 225—1)

The present invention relates to a method and apparatus for the gripping and cutting of very fine wire and more especially to the gripping and cutting of fine refractory metal filament wire as used in certain electric lamps which is of a diameter of .001 inch and less.

The principal problem in gripping such fine wire is that the jaw gripping surfaces must be parallel to each other within a very small tolerance that is less than the wire diameter. For example, in gripping a fine filament wire of 0.0005 inch diameter the gripping surfaces must be parallel within 0.0004 inch and although this is not impossible to achieve, it is nevertheless very expensive to provide such minute tolerance and more significantly the maintenance of such alignment is very critical. At first an obvious solution of the problem would appear to be the provision of self-aligning jaws but the major difficulty with this approach resides in the minute size of the involved parts.

In addition to this gripping problem such small diameter filament wire presents a further difficulty in connection with the cutting thereof. Heretofore, it has been the usual practice to cut wire by shearing blades or with a sharp blade squeezing the wire against a flat surface. While either of these methods are entirely satisfactory for cutting wire having a diameter of 0.002 inch and greater such methods become increasingly troublesome as the wire diameter decreases since any clearance between the blades or the presence of slightly rounded edges results in merely crimping the small wire rather than actually cutting it.

It is accordingly the primary object of the present invention to provide a method and apparatus for the gripping and cutting of exceedingly small diameter refractory metal filament wire by utilization of a floating jaw for firmly gripping the wire under all conditions and thereafter severing the fine wire by creating stresses therein while the wire is across the sharp blade of a knife.

Another object of the present invention is the provision of an apparatus for gripping exceedingly fine filament wire wherein a floating jaw supported by a leaf spring is employed and which positions the pivoting point of such floating jaw very close to the gripping face thus giving greater assurance of proper alignment between the gripping surface of the jaws.

A further object of the present invention is the provision of an apparatus for simultaneously applying high tensional and bending stresses to exceedingly fine refractory metal filament wire while it is across the sharp blade of a knife to cause a definite clear severing thereof.

The foregoing objects of the present invention together with other objects which will become obvious to those skilled in the art from the following description are achieved by providing a pair of gripping jaws wherein one constitutes a floating jaw carried by a leaf spring or the like and having a pivoting point therefor which is very close to the gripping surface so as to reduce the pressure angle at the contact point of the misaligned faces. In addition the gripped exceedingly fine wire is thereafter severed by creating high tensional stresses accompanied by a severe bending stress across the edge of a sharp carbide blade causing the wire to break at such point.

The present invention can be readily understood by reference to the accompanying drawings wherein:

FIGURE 1 is a fragmentary elevational view partly in cross-section of the fine wire gripping and cutting apparatus of the present invention disposed adjacent a work station to which a conventional mounting machine turret is indexed during fabrication of an electric lamp mount;

FIG. 2 is a fragmentary top plan view of the fine wire gripping and cutting apparatus shown in FIG. 1;

FIG. 3 is a perspective view of a mount for a photoflash lamp to which the exceedingly fine-wire filament has been secured by the apparatus of the present invention;

FIG. 4 is a fragmentary elevational view on an enlarged scale of the filament wire gripping and cutting portion of the apparatus as shown in FIG. 1;

FIG. 5 is a cross-sectional view taken on the line V—V of FIG. 7 and looking in the direction indicated by the arrows;

FIG. 6 is a fragmentary elevational view of the filament feed jaw portion of the gripping and cutting portion of the apparatus;

FIG. 7 is a fragmentary plan view partly in section and showing the gripping and cutting portion of the apparatus of the present invention with the filament feed jaw in its closed position while the clamping and auxiliary jaws are in their open position;

FIG. 8 is a fragmentary plan view similar to FIG. 7 but showing all the jaws in their closed position;

FIG. 9 differs from FIG. 8 in showing the filament feed jaws as shifted from their filament gripping dotted line position to their initial filament gripping position preparatory to grasping the fine filament wire; and FIG. 10 is a view similar to FIG. 9 but showing the filament feed jaws in their initially closed filament gripping position which severs the fine filament wire.

Referring now to the drawings in detail, the gripping and cutting apparatus of the present invention as shown in FIG. 1 is disposed at a work station to which the turret 5 of a mounting machine is indexed to present a partially completed lamp mount 6 to the gripping and cutting apparatus for attachment of a filament thereto to complete the mount 7 for a photoflash lamp as seen in FIG. 3. This gripping and cutting apparatus comprises a pedestal shaft 8 vertically reciprocal in a bearing 9 by cyclic operation of a cam (not shown). The upper end of this shaft 8 is provided with a block 10 having a longitudinally extending groove 12. Disposed within this groove 12 and held in place by plates 13 is a slide 14 which is reciprocally movable in the groove 12 by movement of a cam-operated push-rod 15 pivotally connected to a pair of lugs 16 laterally extending from one side of the slide 14.

In addition the slide 14 has a horizontally extending arm portion 17 carrying at the outer end thereof a pair of shafts 18 which are rotatable in opposite directions by a pair of intermeshing gears 19 affixed to one end of such shafts 18. The opposite end of these shafts 18 are provided with a pair of filament feed jaws 20 and 21, as shown more clearly in FIG. 6, the outer ends of which move into and out of engagement with each other upon rotation of the shafts 18. By reference now more particularly to FIG. 6, it will be noted that the filament feed jaw 21 has a floating jaw 22 secured thereto and comprising a thin leaf spring the outer depending end of which carries a tungsten carbide tip 23. For the purpose of closing the filament feed jaws 20 and 21 to their filament wire gripping position, as shown by the dotted lines in FIG. 6, one of the shafts 18 is provided with a rocker-arm 24 biased by a coil spring 25 so as to normally hold the shafts 18 in their jaw-closed position. The opposite end of this rocker-arm 24 is connected by a push-rod 26 forming an extension of the armature of a solenoid 27 (FIG. 2). Upon closure of a cam-operated switch (not shown) such solenoid is energized thereby causing a pull on the push-rod 26 against the tension of spring 25 attached to the other end of rocker-arm 24. Rotation of the gears 19 and rollers 18 follows with periodic opening of the filament feed jaws 20 and 21 to their full line position shown in FIG. 6 at the proper time in the cycle of operation.

Referring again more specifically to FIGS. 1 and 2, it will be noted that the gripping and cutting apparatus is further provided with a stationary support 28 carrying and elongated housing 29 at its upper extremity whose longitudinal axis is disposed at an angle slightly less than ninety degrees relative to the longitudinal axis of the slide 14 (FIG. 2). The interior of this housing 29 is provided with a pair of oppositely reciprocal bars 30 and 32, each of which is provided with a roller 33 disposed in the slot of a circular guide 34, the latter of which is positioned interiorly of a hub 35 on the exterior of the housing 29. This circular guide 34 in turn is connected to a short shaft 36 passing through the hub 35 and connected to one end of a rocker-arm 37 the opposite end of which is raised and lowered by operation of a cam or the like (not shown). Accordingly, as the end of rocker-arm 37 is raised and lowered by the operating cam the shaft 36 causes oscillatory rotary motion of the circular guide 34. Since the rollers 33 ride in the lateral slot of such guide 34 and are connected to the respective bars 30 and 32, the latter are caused to oppositely reciprocate relative to each other interiorly of the housing 29. Such reciprocable bars 30 and 32 each have bifurcated members depending therefrom the lower ends of which are coaxially aligned and approach each other during reciprocation of the bars 30 and 32 to form clamping jaws 38 and auxiliary jaws 39.

By reference now more specifically to FIGS. 4 to 10, it will be noted that the normally closed filament feed jaws 20 and 21 first grip a fine filament wire 40 feeding through a guide 41 (FIG. 2) from a spool (not shown) and holds the proper length of such wire in a horizontal plane between the respective clamping jaws 38 and auxiliary jaws 39, as seen particularly in FIG. 7. At the same time a partially completed lamp mount 6 will be indexed by the mounting machine turret 5 so that it will be positioned between the clamping jaws 38. Thereupon the operating cam raises one end of the rocker-arm 37 causing slight rotary movement of shaft 36 and circular guide 34 with attendant reciprocatory movement of bars 30 and 32. This in turn causes the jaws 38 and 39 to approach each other for the distance indicated by the arrows in FIG. 4 thereby causing the jaws 38 to embed the filament wire 40 into the softer lead wires of the partially completed mount 6 while the auxiliary jaws 39 including the floating jaw portion 42 thereof firmly hold the fine filament wire 40 in its proper position, as can be seen in FIG. 8.

The cam-operated switch (not shown) is then closed to cause energization of the solenoid 27 resulting in the armature pulling on push-rod 26 to open the filament feed jaws 20 and 21. Immediately following opening of these jaws the operating cam raises the pedestal shaft 8 for a sufficient height that the feed jaws 20 and 21 will clear the thickness of the clamping jaws 38 (FIG. 5). Next in the cyclic operation the cam-operated push-rod 15 then pulls on the slide 14 which carries with it the filament feed jaws 20 and 21 until they pass above the clamping jaws 38 and reach a position between the latter and the auxiliary jaws 39 whereupon the pedestal shaft 8 is lowered by its operating cam thus disposing the filament feed jaws 20 and 21 in alignment with the fine filament wire 40, as shown by the full lines in FIG. 9.

Upon returning to such elevation, the cam-operated switch is then opened which deenergizes the solenoid 27 thereby causing the spring 25 to close the filament feed jaws 20 and 21 with attendant regripping of the fine filament wire 40. However, since the faces of the jaws 20 and 21 are disposed at an angle of less than ninety degrees relative to the wire axis, due to the angulation between the slide 14 and the housing 29 with its interior bars 30 and 32 as previously herein mentioned, this regripping of the wire 40 causes it to be pulled to one side creating high tensional stresses therein. In addition, a severe bending stress is induced where the fine filament wire 40 contacts the sharp edge of a carbide blade 43 secured to one side of the clamping jaws 38 which multiple stresses cause the fine filament wire 40 to break at the point of contact with the blade edge. Inasmuch as the distance through which the filament feed jaws 20 and 21 move as well as the position of the blade edge are predetermined this assures that the severed filament embedded in the lead wires of the mount 6 is always of a desired overall length.

Following severance of the filament, the clamping jaws 38 and auxiliary jaws 39 again open in response to movement of the bars 30 and 32 by the cam-operated rocker-arm 37 while the filament wire is held by the filament feed jaws 20 and 21. The completed lamp mount 7 is then indexed out of position and a partially completed new mount 6 is indexed by the turret 5 into position adjacent the clamping jaws 38, as shown in FIGS. 4, 5 and 7. Next, the pedestal shaft 8 is again raised by its operating cam and the push-rod 15 is then also actuated by its operating cam to move the slide 14 and cause the filament wire 40 to be pulled from its spool by the filament feed jaws 20 and 21 as they are moved from their position shown in FIG. 10 back to the outside of the clamping jaws 38. Pedestal shaft 8 is then again lowered to position the filament wire 40 in its horizontal plane between the respective clamping jaws 38 and auxiliary jaws 39 as seen in FIG. 7 ready for regripping as in FIG. 8 preparatory to a repetition of the complete operating cycle of the gripping and cutting apparatus.

It should thus be apparent to those skilled in the art from the foregoing that a method and apparatus has been herein shown and described for the gripping and cutting of exceedingly fine filament wire as used in electric lamps. By providing a floating jaw with a pivot very close to its gripping face as a part of the wire gripping jaws, the pressure angle at the contact point of misaligned surfaces is very greatly reduced resulting in a locking of the jaws on the wire rather than aligning of their faces should face sliding requirements or pressure angle become too great. In addition to firmly gripping such exceedingly fine filament wire the severing thereof is assured by the creation of high tensional stresses in such wire along with a severe bending stress across the sharp edge of a carbide blade thus causing the wire to invariably break at such point.

Although one specific embodiment of the present invention has been herein shown and described it is to be understood that still further modifications thereof may be made without departing from the spirit and scope of the invention.

I claim:
1. The method of gripping and cutting exceedingly fine filament wire to a predetermined length comprising:
   (a) gripping such fine filament wire near its end with a pair of filament feed jaws and pulling a predetermined amount of wire from its feed spool,
   (b) grasping the predetermined amount of wire at definite points with a pair of clamping jaws and a pair of auxiliary jaws,
   (c) releasing the filaments feed jaws and moving them along the wire on the opposite side of said clamping jaws while such wire is gripped by both the clamping jaws and the auxiliary jaws, and
   (d) regripping the wire a predetermined distance from the end thereof and producing a severe bending stress in the wire across a sharp blade to cause the fine filament wire to break at the point of contact with such blade.

2. The method of gripping and cutting exceedingly fine filament wire to a predetermined length comprising:
  (a) gripping such fine filament wire near its end with a pair of filament feed jaws and pulling a predetermined amount of wire from its feed spool,
  (b) grasping the predetermined amount of wire at definite points with a pair of clamping jaws and a pair of auxiliary jaws,
  (c) releasing the filament feed jaws and moving them along the wire on the opposite side of said clamping jaws while such wire is gripped by both the clamping jaws and the auxiliary jaws, and
  (d) regripping the wire a predetermined distance from the end thereof and simultaneously producing a high tensional stress in the wire along with a severe bending stress across a sharp blade to cause the fine filament wire to break at the point of contact with such blade.

3. The method of gripping and cutting exceedingly fine filament wire to a predetermined length comprising:
  (a) gripping such fine filament wire near its end with a pair of filament feed jaws and pulling a predetermined amount of wire from its feed spool,
  (b) grasping the predetermined amount of wire at definite points with a pair of clamping jaws and a pair of auxiliary jaws including a floating jaw as one of such pair to assure firm gripping regardless of alignment of the jaw faces,
  (c) releasing the filament feed jaws and moving them along the wire on the opposite side of said clamping jaws while such wire is gripped by both the clamping jaws and the auxiliary jaws, and
  (d) regripping the wire a predetermined distance from the end thereof and simultaneously producing a high tensional stress in the wire along with a severe bending stress across a sharp blade to cause the fine filament wire to break at the point of contact with such blade.

4. The method of gripping and cutting exceedingly fine filament wire to a predetermined length comprising:
  (a) gripping such fine filament wire near its end with a pair of filament feed jaws including a floating jaw provided with a pivot point close to its gripping surface to compensate for jaw misalignment and pulling a predetermined amount of wire from its feed spool,
  (b) grasping the predetermined amount of wire at definite points with a pair of clamping jaws and a pair of auxiliary jaws including a floating jaw as one of such pair to assure firm gripping regardless of alignment of the jaw faces,
  (c) releasing the filament feed jaws and moving them along the wire on the opposite side of said clamping jaws while such wire is gripped by both the clamping jaws and the auxiliary jaws, and
  (d) regripping the wire a predetermined distance from the end thereof and simultaneously producing a high tensional stress in the wire along with a severe bending stress across a sharp blade to cause the fine filament wire to break at the point of contact with such blade.

5. Apparatus for gripping and cutting fine filament wire and securing a predetermined length thereof to a partially completed mount for an electric lamp comprising:
  (a) means operable to pull a predetermined length of fine filament wire from a feed spool across the lead-in conductors of a partially completed lamp mount,
  (b) means sequentially operable to embed said fine filament wire into the lead-in conductors of said mount,
  (c) a knife blade provided with a sharp edge and disposed in definite relation to said sequentially operable means,
  (d) additional means operable into engagement with the predetermined length of fine filament wire for holding the latter in a definite plane,
  (e) means thereafter operable to cause said first mentioned means to disengage said secured filament wire,
  (f) means operable upon disengagement of said first mentioned means to cause movement of the latter to the opposite side of said sequentially operable means, and
  (g) means operable to cause said first mentioned means to again engage said fine filament wire and bend it across the sharp edge of said blade to cause breaking thereof thus preselecting the length of the filament attached to said lamp mount.

6. Apparatus for gripping and cutting fine filament wire and securing a predetermined length thereof to a partially completed mount for an electric lamp comprising:
  (a) means operable to pull a predetermined length of fine filament wire from a feed spool across the lead-in conductors of a partially completed lamp mount,
  (b) means sequentially operable to embed said fine filament wire into the lead-in conductors of said mount,
  (c) a knife blade provided with a sharp edge and disposed in definite relation to said sequentially operable means,
  (d) additional means simultaneously operable with said sequentially operable means into engagement with the predetermined length of fine filament wire for holding the latter in a definite plane,
  (e) means thereafter operable to cause said first mentioned means to disengage said secured filament wire,
  (f) means operable upon disengagement of said first mentioned means to cause movement of the latter in a plane disposed at an angle of less than ninety degrees relative to the axis of said filament wire and to the opposite side of said sequentially operable means, and
  (g) means operable to cause said first mentioned means to again engage said fine filament wire with creation of high tensional stresses therein and to produce a severe bending stress across the sharp edge of said blade to cause breaking of said filament wire at the point of contact with said blade thus preselecting the length of the filament attached to said lamp mount.

7. Apparatus for gripping and cutting fine filament wire and securing a predetermined length thereof to a partially completed mount for an electric lamp comprising:
  (a) a pair of filament feed jaws operable to grip the end of fine filament wire and pull a predetermined length thereof from a feed spool across the lead-in conductors of a partially completed lamp mount,
  (b) a pair of clamping jaws operable into clamping engagement with said fine filament wire where it crosses the lead-in conductors of said mount to embed said filament wire into said conductors,
  (c) a knife blade provided with a sharp edge and disposed in definite relation to said clamping jaws,
  (d) a pair of auxiliary jaws simultaneously operable with said clamping jaws into engagement with the predetermined length of fine filament wire for holding the latter in a definite plane,
  (e) means thereafter operable to cause said filament feed jaws to open and release said secured filament wire,
  (f) means operable to cause movement of said filament feed jaws to the opposite side of said clamping jaws, and
  (g) means operable to cause said filament feed jaws to again grip said fine filament wire and bend it across the sharp edge of said blade to cause breaking thereof thus preselecting the length of the filament attached to said lamp mount.

8. Apparatus for gripping and cutting fine filament wire and securing a predetermined length thereof to a partially completed mount for an electric lamp comprising:
   (a) a pair of filament feed jaws operable to grip the end of fine filament wire and pull a predetermined length thereof from a feed spool across the lead-in conductors of a partially completed lamp mount,
   (b) a pair of clamping jaws operable into clamping engagement with said fine filament wire where it crosses the lead-in conductors of said mount to embed said filament wire into said conductors,
   (c) a knife blade provided with a sharp edge and disposed in definite relation to said clamping jaws,
   (d) a pair of auxiliary jaws simultaneously operable with said clamping jaws into engagement with the predetermined length of fine filament wire for holding the latter in a definite plane,
   (e) means thereafter operable to cause said filament feed jaws to open and release said secured filament wire,
   (f) means operable to cause movement of said filament feed jaws in a plane disposed at an angle of less than ninety degrees relative to the axis of said filament wire and to the opposite side of said clamping jaws, and
   (g) means operable to cause said filament feed jaws to again grip said fine filament wire with creation of high tensional stresses therein and to produce a severe bending stress across the sharp edge of said blade to cause breaking of said filament wire at the point of contact with said blade and thus preselect the length of the filament attached to said lamp mount.

9. Apparatus for gripping and cutting fine filament wire and securing a predetermined length thereof to a partially completed mount for an electric lamp comprising:
   (a) a pair of filament feed jaws operable to grip the end of fine filament wire and pull a predetermined length thereof from a feed spool across the lead-in conductors of a partially completed lamp mount, said feed jaws including a floating jaw provided with a pivot closely adjacent its gripping face to reduce the pressure angle at the contact point of the gripping face of said jaws with said wire to a minimum,
   (b) a pair of clamping jaws operable into clamping engagement with said fine filament wire where it crosses the lead-in conductors of said mount to embed said filament wire into said conductors,
   (c) a knife blade provided with a sharp edge and disposed in definite relation to said clamping jaws,
   (d) a pair of auxiliary jaws simultaneously operable with said clamping jaws into engagement with the predetermined length of fine filament wire for holding the latter in a definite plane,
   (e) means thereafter operable to cause said filament feed jaws to open and release said secured filament wire,
   (f) means operable to cause movement of said filament feed jaws in a plane disposed at an angle of less than ninety degrees relative to the axis of said filament wire and to the opposite side of said clamping jaws, and
   (g) means operable to cause said filament feed jaws to again grip said fine filament wire with creation of high tensional stresses therein and to produce a severe bending stress across the sharp edge of said blade to cause breaking of said filament wire at the point of contact with said blade and thus preselecting the length of the filament attached to said lamp mount.

10. Apparatus for gripping and cutting fine filament wire and securing a predetermined length thereof to a partially completed mount for an electric lamp comprising:
    (a) a pair of filament feed jaws operable to grip the end of fine filament wire and pull a predetermined length thereof from a feed spool across the lead-in conductors of a partially completed lamp mount,
    (b) a pair of clamping jaws operable into clamping engagement with said fine filament wire where it crosses the lead-in conductors of said mount to embed said filament wire into said conductors,
    (c) a knife blade provided with a sharp edge and disposed in definite relation to said clamping jaws,
    (d) a pair of auxiliary jaws simultaneously operable with said clamping jaws into engagement with the predetermined length of fine filament wire for holding the latter in a definite plane, said auxiliary jaws also including a floating jaw having a pivot point closely adjacent its gripping face to reduce the pressure angle at the contact point of the gripping face of said jaws with said wire to a minimum,
    (e) means thereafter operable to cause said filament feed jaws to open and release said secured filament wire,
    (f) means operable to cause movement of said filament feed jaws in a plane disposed at an angle of less than ninety degrees relative to the axis of said filament wire and to the opposite side of said clamping jaws, and
    (g) means operable to cause said filament feed jaws to again grip said fine filament wire with creation of high tensional stresses therein and to produce a severe bending stress across the sharp edge of said blade to cause breaking of said filament wire at the point of contact with said blade and thus preselecting the length of the filament attached to said lamp mount.

11. Apparatus for gripping and cutting fine filament wire and securing a predetermined length thereof to a partially completed mount for an electric lamp comprising:
    (a) a pair of filament feed jaws operable to grip the end of fine filament wire and pull a predetermined length thereof from a feed spool across the lead-in conductors of a partially completed lamp mount, said feed jaws including a floating jaw provided with a pivot closely adjacent its gripping face to reduce the pressure angle at the contact point of the gripping face of said jaws with said wire to a minimum,
    (b) a pair of clamping jaws operable into clamping engagement with said fine filament wire where it crosses the lead-in conductors of said mount to embed said filament wire into said conductors,
    (c) a knife blade provided with a sharp edge and disposed in definite relation to said clamping means,
    (d) a pair of auxiliary jaws simultaneously operable with said clamping jaws into engagement with a predetermined length of fine filament wire for holding the latter in a definite plane, said auxiliary jaws also including a floating jaw having a pivot point closely adjacent its gripping face to reduce the pressure angle at the contact point of the gripping face of said jaws with said wire to a minimum,
    (e) means thereafter operable to cause said filament feed jaws to open and release said secured filament wire,
    (f) means operable to cause movement of said filament feed jaws to the opposite side of said clamping jaws, and
    (g) means operable to cause said filament feed jaws to again grip said fine filament wire and bend it across the sharp edge of said blade to cause breaking thereof thus preselecting the length of the filament attached to said lamp mount.

12. Apparatus for gripping and cutting fine filament wire and securing a predetermined length thereof to a partially completed mount for an electric lamp comprising:
- (a) a pair of filament feed jaws operable to grip the end of fine filament wire and pull a predetermined length thereof from a feed spool across the lead-in conductors of a partially completed lamp mount, said feed jaws including a floating jaw provided with a pivot closely adjacent its gripping face to reduce the pressure angle at the contact point of the gripping face of said jaws with said wire to a minimum,
- (b) a pair of clamping jaws operable into clamping engagement with said fine filament wire where it crosses the lead-in conductors of said mount to embed said filament wire into said conductors,
- (c) a knife blade provided with a sharp edge and disposed in definite relation to said clamping means,
- (d) a pair of auxiliary jaws simultaneously operable with said clamping jaws into engagement with the predetermined length of fine filament wire for holding the latter in a definite plane, said auxiliary jaws also including a floating jaw having a pivot point closely adjacent its gripping face to reduce the pressure angle at the contact point of the gripping face of said jaws with said wire to a minimum,
- (e) means thereafter operable to cause said filament feed jaws to open and release said secured filament wire,
- (f) means operable to cause movement of said filament feed jaws in a plane disposed at an angle of less than ninety degrees relative to the axis of said filament wire and to the opposite side of said clamping jaws, and
- (g) means operable to cause said filament feed jaws to again grip said fine filament wire with creation of high tensional stresses therein and to produce a severe bending stress across the sharp edge of said blade to cause breaking of said filament wire at the point of contact with said blade and thus preselecting the length of the filament attached to said lamp mount.

References Cited by the Examiner
UNITED STATES PATENTS

| | | | |
|---|---|---|---|
| 2,618,839 | 11/1952 | Morrell | 29—25.2 |
| 2,777,479 | 1/1957 | Beanum | 225—1 |
| 2,977,667 | 4/1961 | Schnering | 29—25.2 |
| 3,062,423 | 11/1962 | Tomka | 225—1 |

WILLIAM W. DYER, Jr., *Primary Examiner.*

J. M. MEISTER, *Assistant Examiner.*